United States Patent [19]
Carroll et al.

[11] Patent Number: 5,553,099
[45] Date of Patent: Sep. 3, 1996

[54] FSK DETECTOR FOR DETERMINING AN INCREASING TIME PERIOD BETWEEN ADJACENT PULSES OF AN FSK MODULATED SQUARE WAVE PULSE TRAIN

[75] Inventors: Gary T. Carroll, Boulder; J. Donald Pauley, Estes Park, both of Colo.

[73] Assignee: Racom Systems, Inc., Englewood, Colo.

[21] Appl. No.: 194,708

[22] Filed: Feb. 10, 1994

[51] Int. Cl.[6] .............................. H03D 3/00; H03C 3/00
[52] U.S. Cl. ......................... 375/334; 375/272; 329/300
[58] Field of Search .................................. 375/334, 337, 375/324, 340, 328, 272, 344; 329/300, 301, 303, 302; 455/130, 275, 304; H03D 3/00

[56] References Cited

U.S. PATENT DOCUMENTS

| | | | |
|---|---|---|---|
| 3,719,779 | 3/1973 | Wilson | 375/272 |
| 3,899,741 | 8/1975 | Brandt et al. | 329/301 |
| 4,015,220 | 3/1977 | Kaufman | 331/179 |
| 4,215,280 | 7/1980 | Mahig | 307/295 |
| 4,309,772 | 1/1982 | Kloker et al. | 375/76 |
| 4,412,338 | 10/1983 | Hendrickson | 375/82 |
| 4,423,519 | 12/1983 | Bennett, Jr. et al. | 375/80 |
| 4,556,866 | 12/1985 | Gorecki | 340/310 |
| 4,568,883 | 2/1986 | Shindley | 329/126 |
| 4,814,717 | 3/1989 | Hooijmans | 329/103 |

OTHER PUBLICATIONS

Ramtron Corporation, R2 92490, Ramtron Brochure, RTx 0801 Ramtag™, 256–Bit Passive Nonvolatile RF/ID Tag Engineering Prototype, 1990, pp. 1–6.

Ramtron International Corporation, Ramtron Brochure, FM1208S FRAM® Memory, 4,096–Bit Nonvolatile Ferroelectric RAM Product Specification, R3 Aug., 1993, pp. 1–8.

*Primary Examiner*—Kim Yen Vu
*Assistant Examiner*—Madeleine Anh-Vinh Nguyen
*Attorney, Agent, or Firm*—William J. Kubida; Holland & Hart LLP

[57] ABSTRACT

An FSK detector circuit and method which may be utilized for the demodulation of a digital data signal from a modulated sine wave carrier signal. A simple, low parts count FSK detector is disclosed which is readily implemented as an integrated circuit for the detection of a digital data signal in wireless applications without the use of an associated phase locked loop or other frequency detection circuitry.

26 Claims, 2 Drawing Sheets

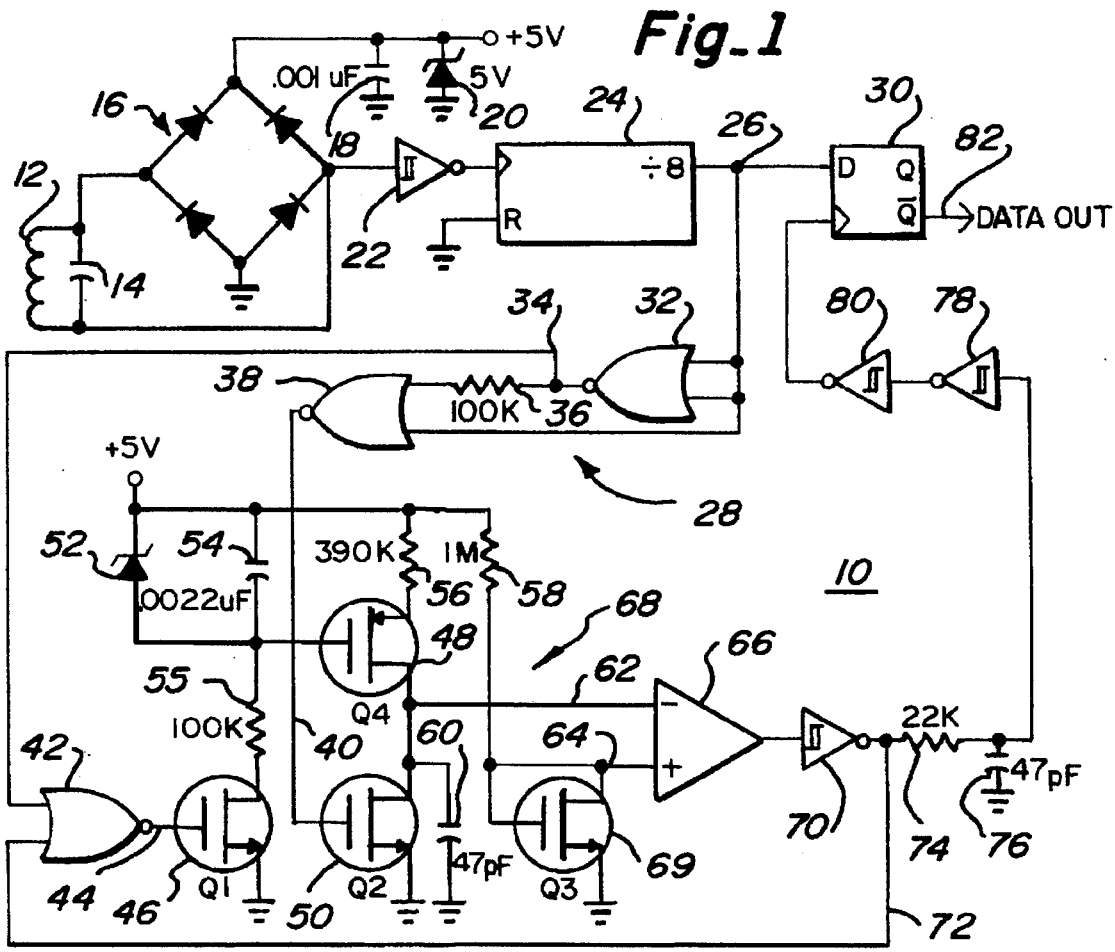
*Fig._1*
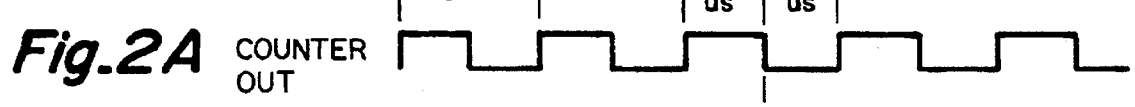
*Fig._2A* COUNTER OUT
*Fig._2B* Q2 GATE
*Fig._2C* Q2 DRAIN
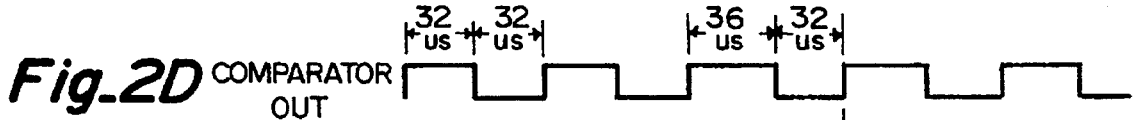
*Fig._2D* COMPARATOR OUT
*Fig._2E* Q1 GATE
*Fig._2F* $\overline{Q}$

FSK DETECTOR FOR DETERMINING AN INCREASING TIME PERIOD BETWEEN ADJACENT PULSES OF AN FSK MODULATED SQUARE WAVE PULSE TRAIN

CROSS REFERENCE TO RELATED APPLICATIONS

The present invention is related to those described in U.S. patent applications Ser. No. 08/194,616 for "PASSIVE RF TRANSPONDER AND METHOD"; Ser. No. 08/194,694 for "INTEGRATED ASYNCHRONOUS FSK DETECTOR AND METHOD"; Ser. No. 08/194,723 for "COMMUNICATIONS SYSTEM UTILIZING FSK/PSK MODULATION TECHNIQUES"; Ser. No. 08/195,162 for "LOW POWER CONSUMPTION OSCILLATOR USING MULTIPLE TRANSCONDUCTANCE AMPLIFIERS"; and Ser. No. 08/194,707 for "POWER SUPPLY AND POWER ENABLE CIRCUIT FOR AN RF/ID TRANSPONDER", filed concurrently herewith and assigned to the assignee of the present invention, the disclosures of which are hereby specifically incorporated by this reference.

BACKGROUND OF THE INVENTION

The present invention relates, in general, to the field of frequency shift keying detector circuits and methods utilized for the demodulation of a digital data signal from a modulated sine wave carrier signal. More particularly, the present invention relates to a simple, low parts count frequency shift keying detector and method which is readily implemented in an integrated circuit for the detection of a digital data signal in wireless applications without the use of an internal reference frequency.

In its simplest terms, a digital data signal may be used to modulate the amplitude, the frequency or the phase of a sine wave carrier depending upon the particular application. Respectively, these three types of modulation are known as amplitude shift keying ("ASK") frequency shift keying ("FSK") and phase shift keying ("PSK"). In any of these modulation techniques, the modulated carrier takes on one of two states, that is, either one of two amplitudes, two frequencies, or two phases. The two states of the modulated signal then represent either a logic "zero" or a logic "one".

As noted above, changing the frequency of the modulated signal to denote either of two digital logic states is called FSK modulation. FSK modulation offers a number of advantages in certain applications over other modulation techniques with respect to noise immunity and average signal power level. However, in conventional FSK detectors, it is necessary to have a phase locked loop ("PLL") or other frequency detection circuitry associated with the detector in order to determine whether a change in frequency denoting a data bit "one" or "zero" has occurred.

Therefore, while it would be advantageous to use FSK modulation techniques to transmit data to, for example, a passive radio frequency ("RF") identification ("ID") receiver or transponder, it has heretofore been impractical to incorporate an on-board PLL or other frequency detection circuit in such a device. Moreover, due to the packaging, and hence integrated circuit die size constraints imposed by such applications, the FSK detector must be effective, readily integratable and consume little on-chip "real estate".

SUMMARY OF THE INVENTION

The present invention herein described discloses an FSK detector circuit and method which is straightforward in design and may be readily implemented as a portion of an integrated circuit utilizing a minimum number of on-chip components. The circuit and method of the present invention will effectively demodulate an FSK modulated digital data signal without the use of an associated PLL or other frequency detection circuit and can be utilized as a detector circuit in a passive RF transponder ID card.

In accordance with the present invention, an FSK detector circuit is provided for demodulating a data signal from a first generally square wave pulse train having first and second transitions thereof. A pulse generator circuit provides a fixed duration pulse at each first transition of the first generally square wave pulse train. A frequency shifting circuit is responsive to the pulse generator circuit for producing a second generally square wave pulse train having first and second transitions thereof, the first transition of the second generally square wave pulse train being delayed generally in response to an increased time between successive ones of the fixed duration pulses. The frequency shifting circuit produces a first clocking pulse signal when the first transitions of the first and second generally square wave pulse trains and a second clocking pulse signal when the first transitions of the first and second generally square wave pulse trains are not coincident. A signal coincidence detector is coupled to the frequency shifting circuit and is responsive to the first and second clocking pulse signals for providing an output corresponding to the data signal having a first logic output level in response to the first clocking pulse signal and a second logic output level in response to the second clocking pulse signal.

In accordance with a more particular embodiment of the present invention, an FSK detector circuit for demodulating a digital data signal from a sine wave carrier signal is disclosed which comprises a signal conditioning circuit for producing a first generally square wave pulse train having a first frequency corresponding to the sine wave carrier signal. The first generally square wave pulse train has first and second transitions thereof and a pulse generator circuit is responsive to the signal conditioning circuit for providing a fixed duration pulse at each first transition of the first generally square wave pulse train. A frequency shifting circuit is responsive to the signal conditioning circuit and the pulse generator circuit for producing a generally ramp shaped signal between successive ones of the fixed duration pulses. The frequency shifting circuit also includes a comparator for producing a second generally square wave pulse train having first and second transitions thereof. The first transition of the second generally square wave pulse train is delayed in response to an increased level of the ramp shaped signal between successive ones of the fixed duration pulses. The frequency shifting circuit produces a first clocking pulse signal when the first transitions of the first and second generally square wave pulse trains are coincident and a second clocking pulse signal when the first transitions of the first and second generally square wave pulse trains are not coincident. A signal coincidence detector is coupled to the signal conditioning circuit and is responsive to the first and second clocking pulse signals for providing an output corresponding to the digital data signal having a first logic output level in response to the first clocking pulse signal and a second logic output level in response to the second clocking pulse signal.

In accordance with a method of the present invention, a method is disclosed for demodulating an FSK encoded data signal from a first generally square wave pulse train having first and second transitions thereof. A fixed duration pulse is provided at each of the first transitions of the first generally square wave pulse train and a second generally square wave pulse train is produced having first and second transitions thereof corresponding to the first and second transitions of the first generally square wave pulse train. A time period between successive ones of the fixed duration pulses is compared to a time period between proceeding successive ones of the fixed duration pulses and the first transition of the second generally square wave pulse train is delayed in response to an increased time period between successive ones of the fixed duration pulses. The coincidence of the first transitions of the first and second generally square wave pulse trains is monitored and a first clocking pulse signal is outputted when the first transitions of the first and second generally square pulse trains are coincident and a second clocking pulse is outputted when the first transitions of the first and second generally square wave pulse trains are not coincident.

BRIEF DESCRIPTION OF THE DRAWINGS

The aforementioned, and other features and objects of the present invention and the manner of attaining them will become more apparent and the invention itself will be best understood by reference to the following description of a preferred embodiment taken in conjunction with the accompanying drawings, wherein:

FIG. 1 is a detailed schematic diagram of an FSK detector circuit in accordance with the present invention for use, in the embodiment illustrated, for detecting frequency shifts corresponding to digital data in an incoming signal having a nominal frequency of approximately 125 KHz;

FIG. 2A is a representative waveform depicting the period of the signal appearing at the output of the binary counter in response to an incoming signal having a frequency of approximately 128 KHz shifting to 117.6 KHz;

FIG. 2B is a corresponding representative waveform depicting the coincidence of a 0.5 microsecond pulse output from the pulse generator to the gate of transistor Q2 on the negative going transition of the binary counter output signal;

FIG. 2C is a further corresponding representative waveform of the generally ramp shaped waveform appearing at the drain terminal of transistor Q2 illustrating that a higher voltage level is achieved when the time period between the 0.5 microsecond pulses at its gate is increased due to a downward shift in the frequency of the incoming signal;

FIG. 2D is a further corresponding representative waveform depicting the signal appearing at the output of the comparator in response to a downward shift in the frequency of the incoming signal;

FIG. 2E is a further corresponding representative waveform depicting the gate drive to transistor Q1 when the pulse signals to the input of the driving NOR gate are coincident, and then not coincident due to a shift in the frequency of the incoming signal;

FIG. 2F is a corresponding representative wave form showing the output of the FSK detector taken at the $\overline{Q}$ output of the flip flop in response to a shift in the frequency of the incoming signal.

DESCRIPTION OF A PREFERRED EMBODIMENT

Figure 3:
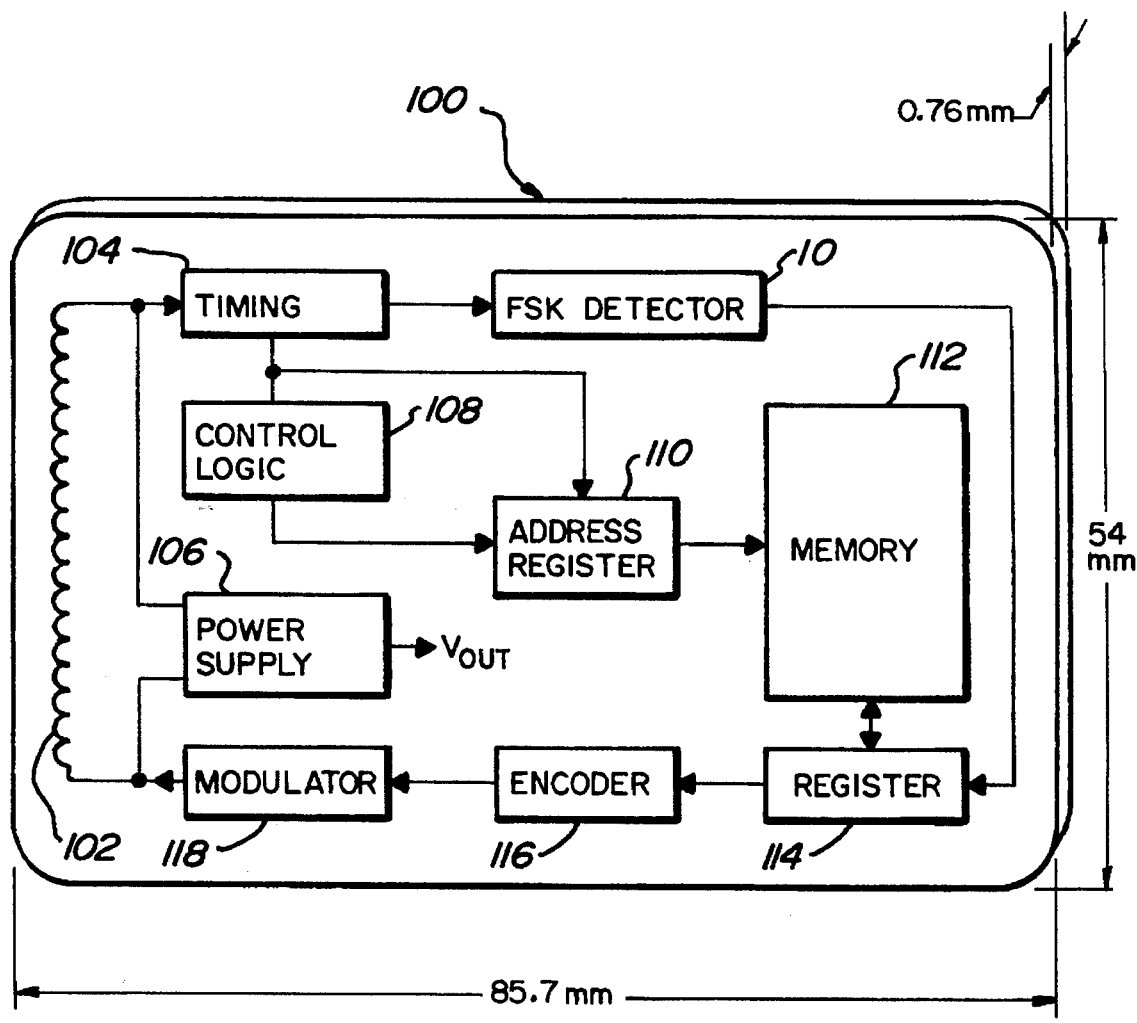
FIG. 3 is an isometric view illustrating the possible use of the FSK detector of the present invention as a detector circuit in a passive RF transponder ID card in functional combination with other circuit elements thereof.

With reference now to FIG. 1, the FSK detector 10 of the present invention is shown. In the embodiment of FSK detector 10 illustrated, the component values will generally correspond to a nominal sine wave carrier frequency of approximately 125 KHz. The modulated digital data signal is received by antenna coil 12 which further includes a shunt tuning capacitor 14, which in an integrated circuit version of the FSK detector, may conveniently be provided as a ferroelectric capacitor. The output of the antenna coil 12 and tuning capacitor 14 is applied across a full wave bridge 16 which may comprise, a number of series/parallel connected diodes. A parallel connected capacitor 18 and zener diode 20 couple a supply voltage source to circuit ground in parallel with the full wave bridge 16.

Output of the full wave bridge 16 is applied to the input of a Schmitt trigger 22 which performs a signal conditioning function by "squaring" the sine wave input signal to a generally square wave signal for use by the associated digital circuitry. The output of the Schmitt trigger 22 is applied to the clocking input of a binary counter 24 which has its reset input held low by means of a connection to circuit ground.

The output of binary counter 24 is taken at the third, or divide by 8, output for application to divide by eight output line 26 which is coupled to the data input of flip flop 30 which functions as a signal coincidence detector as will be more fully described hereinafter. The divide by eight output line 26 is also provided as one input to a pulse generator 28 comprising inverter 32 and NOR gate 38. The output of inverter 32 is supplied on input line 34 to one input of NOR gate 42 as shown. The signal on input line 34 is also coupled through resistor 36 to an additional input of NOR gate 38, which input has a small amount of parasitic capacitance coupling it to circuit ground (not shown). The other input of NOR gate 38 is connected to the divide by eight output line 26. The output of NOR gate 38 is applied to the gate of transistor 50 (Q2) on pulse line 40.

Diode 52 and capacitor 54 are connected in parallel between a source of supply voltage and a resistor 55 connected to the drain terminal of transistor 46 (Q1). In an integrated circuit version of the FSK detector 10, capacitor 54 may be conveniently provided as a ferroelectric capacitor. The source terminal of transistor 46 is connected to circuit ground and its gate is driven by the output of NOR gate 42 on gate drive line 44.

The source terminal of transistor 48 (Q4) is coupled to the supply voltage source through resistor 56 and its gate terminal is connected between capacitor 54 and resistor 55. The drain terminal of transistor 48 is connected to the drain terminal of transistor 50 and is coupled to circuit ground through capacitor 60. The common connected drain terminals of transistors 48, 50 furnish a comparator − input 62 to comparator 66. An additional transistor 69 (Q3) has its drain and gate terminals common connected to resistor 58 to form a comparator + input 64 to comparator 66. The source terminal of transistor 69 is coupled to circuit ground as shown.

Output of comparator 66 is supplied through Schmitt trigger 70 to provide a signal on comparator output line 72 forming the remaining input to NOR gate 42. The signal on comparator output line 72 is also coupled through resistor 74 to series connected Schmitt triggers 78 and 80. The input to Schmitt trigger 78 is coupled to circuit ground by means of capacitor 76. Resistor 74 and capacitor 76 provide a delay so that the clocking inputs to the flip flop 30 arrive after the signal on the divide by eight output line 26 coupled to the D input of the flip flop 30 has settled. The output of Schmitt trigger 80 is provided to the clocking input of flip flop 30 and the demodulated digital data is output from the FSK detector 10 on data output line 82 of flip flop 30.

With reference additionally to FIGS. 2A–2F, the operation of the FSK detector 10 will be described in more detail. Functionally, antenna coil 12 in conjunction with the tuning capacitor 14 are tuned to the incoming frequency of the sine wave signal carrier which in the embodiment illustrated is assumed to be approximately 125 KHz. The detected signal is then passed through a conventional full wave bridge 16 which, although illustrated as comprising four diodes, may alternatively comprise a number of diodes and field effect transistors ("FET"). The output of the full wave bridge 16 applied to Schmitt trigger 22 as a sine wave of 125 KHz.

The Schmitt trigger 22 conditions, or "squares up" the signal which is then applied to binary counter 24. In a non-integrated circuit version of the FSK detector 10, binary counter 24 may be furnished as a Motorola 74HC4040 device with its output taken at the "Q3" output resulting in a signal on divide by eight output line 26 having a period which is eight times the period of the signal input to binary counter 24. This signal then is illustrated in FIG. 2A as having a period of 64 microseconds.

The output of binary counter 24 is then applied to the pulse generator 28 which may be constructed of portions of a Motorola MC74HC02 quad NOR gate in non-integrated circuit versions of the FSK detector 10. Inverter 32 is formed by coupling the two inputs to one of the NOR gates together and its output on input line 34 is supplied as an input to NOR gate 42 as previously described. The output of NOR gate 38 which comprises the output of pulse generator 28 is a 0.5 microsecond pulse on pulse line 40 which is applied to the gate of transistor 50. The pulse appearing at the output of pulse generator 28 is depicted in FIG. 2B and occurs on every negative going transition of the signal on divide by eight output line 26 from binary counter 24.

Each time the 0.5 microsecond pulse is applied to the gate of transistor 50 the charge previously stored on capacitor 60 is shorted out bringing the capacitor back to a circuit ground reference level. The capacitor 60 is charged through transistor 48 which has its source terminal coupled to a supply voltage through resistor 56. In operation, the charge stored on capacitor 54 holds transistor 48 on in order to charge capacitor 60. Diode 52, which may be a zener or a Schottky device functions as a very large resistance to provide leakage for capacitor 54 such that a charge is not permanently held on it.

The charge on capacitor 54 is controlled through transistor 46 which, in turn, is controlled by a pulsed signal appearing on gate drive line 44 at the output of NOR gate 42. As shown in more detail in FIG. 2C, each time a pulse is applied to the gate of transistor 50 on pulse line 40, the charge on capacitor 60 is brought down to zero and then allowed to charge to a level which is determined by the amount of time between successive pulses at the gate of transistor 50.

Comparator 66, which may be a Motorola MC33171 device in non-integrated circuit embodiments of the FSK detector 10, is utilized to compare the signal level on the drain of transistor 50 on comparator input 62 to a reference voltage set up by means of transistor 69 connected to the comparator + input 64. Connecting transistor 69 as shown, a reference threshold voltage of approximately 1.2 volts is established.

With additional reference to FIG. 2D, the output of the comparator 66 (as squared up by means of Schmitt trigger 70) is shown as supplied on comparator output line 72 to the other input of NOR gate 42. As shown, when the frequency of the input sine wave carrier signal is changed from a value of, for example, 128 KHz to approximately 117.6 KHz, the period of the signal appearing on divide by eight output line 26 will change from a total of 64 microseconds to a total of 68 microseconds. In this manner, the voltage on the drain of transistor 50 will increase for an additional two microseconds (or a total of 36 microseconds) thereby reaching a slightly higher level on comparator − input line 62 and causing the comparator 66 to output a pulse that is 2 microseconds longer. In turn, this causes the output of the Schmitt trigger 70 as supplied by comparator 66 to undergo a negative transition two microseconds after the signal appearing at the output of the binary counter 24. In this manner, the input signals to NOR gate 42 will no longer be coincident logic "zero" but rather a logic zero on input line 34 while a logic one input appears on comparator output line 72. Due to the function of the NOR logic, a logic level zero will appear on gate drive line 44 to the gate of transistor 46 as shown in FIG. 2E. Stated another way, when the negative transitions on the input line 34 from pulse generator 28 and comparator output line 72 are both at a logic "zero," a logic one will be generated on gate drive line 44 as a pulse. In all other instances, no drive pulse will be applied to the gate of transistor 46.

The signal on capacitor 60 is functionally a ramp shaped signal as previously described which is allowed to rise and then is suddenly brought down on each pulse appearing at the output of pulse generator 28. The ramp shaped signal is centered about the reference point created by transistor 69 such that the output of comparator 66 tracks directly with that out of the binary counter 24. These two signals are fed back to the inputs of the NOR gate 42 and are actually out of phase such that a feedback loop is established which attempts to maintain that 180° phase shift. In this manner, the voltage seen at the gate of transistor 46 is a pulse and it is this pulse that maintains the charge then on capacitor 54. The pulse appearing on gate drive line 44 turns on transistor 46 briefly which then dumps a small amount of current through resistor 55 and that in turn sets the flow through transistor 48 which determines the ramp rate on the capacitor 60. In this manner, the signal appearing on comparator— input line 62 takes slightly longer to match the reference set up by the transistor 69 such that a negative going transition on comparator output line 72 takes an additional two microseconds to reach the input of NOR gate 42.

Flip flop 30 is constantly monitoring the output of the binary counter 24 on divide by eight output line 26 such that when the frequency shifting circuit 68 is synchronized, the flip flop 30 is clocked by the signal appearing on comparator output line 72. A one microsecond delay is brought about through the network created by resistor 74 and capacitor 76. Therefore, the output of $\overline{Q}$ on data output line 82 is ordinarily at a logic "zero". However, when a shift in frequency is detected by frequency shifting circuit 68, and the duration of the pulses on divide by eight output line 26 increases, the $\overline{Q}$ output on data output line 82 shifts to a logic "one" state as shown in FIG. 2F. Eventually, over a time period determined by the capacitance of capacitor 54, the $\overline{Q}$ output on data output line 82 of flip flop 30 will transition back to the zero state. For the embodiment of the FSK detector 10 above-described, it has been assumed that the duration of the 117.6 KHz signal is equivalent to the discharge time of capacitor 54.

With additional reference now to FIG. 3, the FSK detector 10 of the present invention may be utilized as a detector circuit in a passive RF transponder 100 in conjunction with other functional logic blocks thereof. The passive RF transponder 100 may be manufactured in a card-sized form factor having approximate physical dimensions of 3.375 inches (85.7 mm) by 2.125 inches (54.0 mm) by 0.030 inches (0.76 mm) and a more detailed description thereof is contained in U.S. patent application Ser. No. 08/194,616 for "PASSIVE RF TRANSPONDER AND METHOD" filed concurrently herewith and assigned to the assignee of the present invention, the disclosure of which is hereby specifically incorporated by this reference.

Passive RF transponder 100 comprises, with respect to its primary functional elements, an antenna 102 for receiving an FSK modulated signal from an associated controller. Antenna 102 is also utilized to transmit a signal back to the controller indicative of information stored in the passive RF transponder 100. Signal output from the antenna 102 is applied to a timing circuit 104 for deriving a clock signal from the received FSK modulated RF signal and supplying the same to the FSK detector 10 as well as to a control logic circuit 108 and an address register 110. A source of power (Vout) for the passive RF transponder 100 is derived by a power supply 106 utilizing the electromagnetic energy in the received FSK modulated RF signal.

The control logic circuit 108 controls the functionality of the passive RF transponder 100 and is utilized to selectively address specific word locations within the memory array 112 by means of the address register 110. Data representing commands or information data detected by means of the FSK detector 10 is supplied to a register 114 to allow data to be either written to or read out from the memory array 112 at the address determined by the address register 110. Information to be transmitted back to the associated controller is held in the register 114 and subsequently encoded by means of encoder circuit 116 for output to a modulator circuit 118. The output of the modulator circuit 118 is supplied to the antenna 102 for transmission back to the associated controller.

What has been provided, therefore, is an FSK detector circuit and method which is straightforward in design and may be readily effectuated as a portion of an integrated circuit utilizing a minimum number of on-chip components. The circuit and method of the present invention will effectively demodulate an FSK modulated digital data signal without the use of an associated PLL or other frequency detection circuitry.

While there have been described above, the principles of the present invention in conjunction with a specific embodiment thereof, the foregoing description is made only by way of example and not as a limitation to the scope of the invention.

What is claimed is:

1. An FSK detector circuit for demodulating a data signal from a first generally square wave pulse train having first transitions and second transitions, comprising:

a pulse generator circuit receiving said first generally square wave pulse train, and providing a series of time-spaced output pulses, each of said output pulses within said series of output pulses being generally coincident with a said first transition of said first generally square wave pulse train;

a frequency shifting circuit responsive to said series of time-spaced output pulses, and producing a second generally square wave pulse train having first transitions and second transitions, said first transitions of said second generally square wave pulse train being time delayed in response to an increased time period between adjacent ones of said time-spaced output pulses; and a signal coincidence detector having a first input coupled to receive said first generally square wave pulse train, and having a second input coupled to receive said second generally square wave pulse train, said signal coincidence detector producing a data signal having a first logic level in response to said first transitions of said first and second generally square wave pulse trains being in time coincident, and producing a second logic level in response to said the absence of first transitions of said first and second generally square wave pulse trains being in time coincident.

2. The FSK detector circuit of claim 1 further comprising:

a signal conditioning circuit for producing said first generally square wave pulse train in response to said signal conditioning circuit receiving an input sine wave signal having a frequency that determines a frequency of said first and second transitions of said first generally square wave pulse train.

3. The FSK detector of claim 2 wherein said sine wave signal is an RF carrier signal.

4. The FSK detector circuit of claim 2 wherein said signal conditioning circuit comprises a Schmitt trigger.

5. The FSK detector circuit of claim 2 wherein said signal conditioning circuit further comprises a full wave rectifier circuit.

6. The FSK detector circuit of claim 2 further comprising:

a counter circuit having an input coupled to receive said sine wave signal, and having an output coupled to an input of said pulse generator circuit, said counter circuit producing said first generally square wave pulse train by reducing said frequency of said sine wave signal.

7. The FSK detector circuit of claim 1 wherein said frequency shifting circuit comprises a comparator for producing said second generally square wave pulse train.

8. The FSK detector circuit of claim 7 further comprising:

a coincidence-detecting logic gate having as two inputs said first and said second generally square wave pulse trains, said logic gate providing feedback to said frequency shifting circuit.

9. The FSK detector circuit of claim 1 wherein said signal coincidence detector comprises a flip flop.

10. The FSK detector circuit of claim 1 wherein said data signal is a digital data signal.

11. An FSK detector circuit for demodulating a digital data signal from a sine wave carrier signal, comprising:

a signal conditioning circuit connected to receive said sine wave carrier signal, and producing an output comprising a first generally square wave pulse train having a frequency corresponding to said sine wave carrier signal;

said first generally square wave pulse train having first transitions and second transitions;

a pulse generator circuit connected to receive said output of said signal conditioning circuit, and providing output pulses, each output pulse occurring substantially coincident with occurrence a first transition of said first generally square wave pulse train;

a ramp generating circuit connected to receive said output pulses of said pulse generator circuit, and providing an output comprising a generally ramp shaped signal having a level that increases as a function of an increased time interval between adjacent ones of said output pulses of said pulse generator circuit;

a level comparator connected to receive said ramp shaped signal as a first input, and connected to receive a reference level as a second input, and producing an output comprising a second generally square wave pulse train having first transitions and second transitions;

said first transition of said second generally square wave pulse train occurring at a time that is responsive to said level of said ramp shaped signal; and a signal coincidence detector having a first input coupled to receive said output of said signal conditioning circuit, and having a second input coupled to receive said output of said level comparator, and producing a digital data output having a first logic level in response to the presence of coincidence of transitions of said first and second generally square wave pulse trains, and having a second logic output level in response to the absence of coincidence of transitions of said first and second generally square wave pulse trains.

12. The FSK detector circuit of claim 11 further comprising:

a counter circuit coupled to said signal conditioning circuit for causing the frequency of said first generally square wave pulse train to a sub-multiple of the frequency of said sine wave carrier signal.

13. The FSK detector circuit of claim 11 wherein said signal conditioning circuit comprises a Schmitt trigger.

14. The FSK detector circuit of claim 13 wherein said signal conditioning circuit further comprises a full wave rectifier circuit.

15. The FSK detector circuit of claim 11 wherein said frequency shifting circuit further comprises:

a logic gate having a feedback output coupled to said ramp generator circuit, and having as first and second inputs said first and second generally square wave pulse trains.

16. The FSK detector circuit of claim 11 wherein said generally ramp shaped signal is generated by charging a resistive-capacitive network between adjacent ones of said output pulses of said pulse generator circuit.

17. The FSK detector circuit of claim 11 wherein said signal coincidence detector comprises a flip flop.

18. A method for demodulating an FSK encoded data signal from a first generally square wave pulse train having a first transition and a second transition, comprising the steps of:

providing a fixed duration pulse at each first transition of said first generally square wave pulse train, wherein adjacent pulses of said fixed time duration pulses having a time period existing therebetween;

producing a second generally square wave pulse train having a first transition and a second transition corresponding to said first and second transitions of said first generally square wave pulse train;

comparing a said time period between current adjacent pulses of said fixed duration pulses to a said time period between preceding adjacent pulses of said fixed duration pulses;

delaying said first transition of said second generally square wave pulse train in response to said comparing step detecting an increased time period between said current adjacent pulses of said fixed duration pulses;

monitoring coincidence of said first transitions of said first and second generally square wave pulse trains;

outputting a first signal when said first transitions of said first and second generally square wave pulse trains are coincident; and outputting a second signal when said first transitions of said first and second generally square wave pulse trains are not coincident.

19. The method of claim 18 further comprising the step of:

conditioning a sine wave signal having a frequency to produce said first generally square wave pulse train having a frequency that corresponds to said frequency of said sine wave.

20. The method of claim 18 further comprising the step of:

reducing said frequency of the first generally square wave pulse train prior to said step of providing.

21. The method of claim 20 wherein said step of reducing is carried out by means of a binary counter.

22. The method of claim 18 wherein said step of providing is carried out by means of a Schmitt trigger.

23. The method of claim 18 wherein said steps of producing and comparing are carried out by means of a comparator.

24. The method of claim 18 wherein said step of delaying comprises the steps of:

charging a resistive-capacitive network between said preceding adjacent pulses of said fixed duration pulses to thereby produce a first voltage level;

charging a resistive-capacitive network between said current adjacent pulses of said fixed duration pulses to thereby produce a second voltage level; and determining whether said second voltage level exceeds said first voltage level to thereby detect said increased time period.

25. The method of claim 18 wherein said step of monitoring includes the step of:

providing a feedback logic gate having as inputs said first and second generally square wave pulse trains.

26. The method of claim 25 further comprising the steps of:

providing said first signal as a first logic level signal when said first transitions of said first and second generally square wave pulse trains are coincident, and providing said second signal as a second logic level signal when said first transitions of said first and second generally square wave pulse trains are not coincident.

* * * * *